United States Patent
Raphel et al.

(10) Patent No.: US 8,259,571 B1
(45) Date of Patent: Sep. 4, 2012

(54) HANDLING OVERLAPPING IP ADDRESSES IN MULTI-TENANT ARCHITECTURE

(75) Inventors: Jose Raphel, Austin, TX (US); Kailash Kailash, San Jose, CA (US); Srikanth Devarajan, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 253 days.

(21) Appl. No.: 12/732,858

(22) Filed: Mar. 26, 2010

(51) Int. Cl.
*G01R 31/08* (2006.01)

(52) U.S. Cl. ......... 370/230; 370/235; 370/252; 370/392

(58) Field of Classification Search .................. 370/230, 370/235, 252, 254, 328, 338, 389, 392, 401
See application file for complete search history.

(56) References Cited

U.S. PATENT DOCUMENTS

| | | | |
|---|---|---|---|
| 6,816,890 B2 * | 11/2004 | Noda et al. | 709/213 |
| 7,542,476 B2 | 6/2009 | Almog et al. | |
| 2007/0121615 A1 * | 5/2007 | Weill et al. | 370/389 |
| 2008/0212579 A1 * | 9/2008 | LaVigne et al. | 370/389 |
| 2010/0214913 A1 * | 8/2010 | Kompella | 370/230 |
| 2010/0290621 A1 * | 11/2010 | Muhanna et al. | 380/270 |

* cited by examiner

*Primary Examiner* — Jung Park
(74) *Attorney, Agent, or Firm* — Clements Bernard PLLC; Lawrence A. Baratta, Jr.; Christopher L. Bernard (57) ABSTRACT

Systems, methods and apparatus for tunneling in a cloud based security system. A multi-tenant cloud-based security system that can distinguish between client computing devices with overlapping private IP addresses is disclosed. Client devices communicate through a processing node to which a tunnel is established. The processing node is able to detect the client devices and apply security policies to the device.

22 Claims, 7 Drawing Sheets

HANDLING OVERLAPPING IP ADDRESSES IN MULTI-TENANT ARCHITECTURE

BACKGROUND

This disclosure relates to tunneling and security provisioning.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

However, such layered security systems are prone to processing inefficiencies and can require many resources within the enterprise to maintain the systems. The use of an "in-the-cloud" distributed security system that provides security services external to a network edge of an enterprise can overcome many of these processing inefficiencies. One example of such a system is the Global Cloud Infrastructure provided by Zscaler, Inc., of Sunnyvale, Calif.

In such a distributed security system, an enterprise can transmit data to and receive data from the distributed security system by use of tunneling technologies. A tunneling protocol enables one network protocol (the delivery protocol) to encapsulate packet that conform to a payload protocol to carry a payload over an incompatible delivery network, or can provide a secure path through an open network. Example tunneling technologies include generic routing encapsulation (GRE), layer two tunneling protocol (L2TP), point-to-point tunneling protocol (PPTP) or IPSec protocols may be used. Virtual private network (VPN) routers and VPN concentrators can be used to achieve the traffic redirection for tunneling.

The use of tunneling, however, presents the enterprise and the security provider with specific challenges and problems. One problem is that each enterprise has at least one logically independent internet protocol (IP) sub-network. As a result, an end device in a first independent IP sub-network for a first enterprise may have the same IP address as an end device in a second independent IP sub-network for a second enterprise. When the IP data packets are sent from the devices are encapsulated in respective tunnels to the security provider, the tunnel traffic from each enterprise can be readily identified by a tunnel identifier, e.g., the respective IP addresses of the edge routers of each enterprise. However, when the encapsulated packets are decapsulated from the GRE packet, the packets may have the same source IP address and source port. Furthermore, when the packets are being sent to the same external end device, e.g., a search engine server, for example, the destination IP addresses can also be the same, as can the port numbers. Thus, in some cases, the packets from the respective end devices in each enterprise, after decapsulation, can have the same addressing information, resulting in addressing ambiguity.

SUMMARY

In general, one innovative aspect of the subject matter described in this specification can be embodied in methods that include the actions of a system comprising a data processing apparatus external to a plurality of logically independent internet protocol (IP) subnets and a memory store in data communication with the data processing apparatus and storing computer-readable instructions executable by the data processing apparatus and that upon execution cause the data processing apparatus to perform operations comprising, for each logically independent IP subnet, hosting a tunnel endpoint, the tunnel endpoint being for a corresponding tunnel connection between the data processing apparatus and the logically independent IP subnet, the tunnel endpoint being identified by a tunnel identifier, receiving tunnel packets through the tunnel, each tunnel packet encapsulating a payload packet, the payload packet including a packet source address and a packet destination address, the packet source address defining a source IP address and a source port number, the source IP address being an IP address assigned to a device in the logically independent subnet with which the corresponding tunnel connection is established, and the packet destination address defining a destination IP address to which the payload packet is addressed, generating a source identifier from the tunnel identifier and packet address, mapping the source identifier to a translated packet source address, and addressing the payload packet to the destination address using the translated packet source address. Other embodiments of this aspect include corresponding systems, apparatus, and computer programs, configured to perform the actions of the methods, encoded on computer storage devices.

In general, various aspects of the subject matter described in this specification can be embodied in methods that include the following actions of a processing node: generating the source identifier from the tunnel identifier and packet address comprises generating the source identifier from the tunnel identifier, source IP address, and source port number, and mapping the source identifier to the translated packet source address comprises generating, by the data processing apparatus, a new source IP address and a new port number, and mapping the source identifier to the new source IP address and the new port number. Generation of the source identifier from the tunnel identifier and packet address comprises generating a new port number from the tunnel identifier, the source IP address and the source port number. Generation of the new port number, wherein the new port number is an n-bit number, comprises, concatenating the tunnel identifier, the source IP address, and the port number, and generating an n-bit hash of the concatenation of the tunnel identifier, the source IP address, and the port number. Generating the new port number, wherein the new port number is an n-bit number, comprises generating a modulo value from the tunnel identifier and a number quantifying the number of available IP addresses that the data processing apparatus can assign to an outgoing packet, concatenating the modulo value, the source IP address, and the port number, and generating an n-bit hash of the concatenation of the modulo value, the source IP address, and the port number. Generating a source identifier from the tunnel identifier and packet address comprises generating a tuple comprising the tunnel identifier, the source IP address, and the destination IP address, and mapping the source identifier to the translated packet source address comprises generating connection data defining an association of first and second sockets, the first socket defining a connection from an edge router that is assigned the source IP address to the data processing apparatus, and the second socket defining a connection from the data processing apparatus to a device at the destination IP address. Including the source IP address substituted for the IP address of the data processing apparatus. Hashing the tuple and indexing the connection data by the hash of the tuple. Generating the source identifier from the tunnel identifier and packet address comprises concatenating the tunnel identifier with the source port number. Generating the tunnel identifier wherein the tunnel identifier for each tunnel endpoint comprises an IP address of an edge router connected to the data processing apparatus by the tunnel connection. Generating the tunnel identifier each tunnel endpoint that comprises a unique n-bit number generated by the data processing apparatus and is associated with an IP address of an edge router connected to the data processing apparatus by the tunnel connection.

Another innovative aspect of the subject matter described in this specification can be embodied in methods that include the actions of a data processing apparatus external to a plurality of logically independent internet protocol (IP) subnets, comprising, for each logically independent IP subnet, hosting a tunnel endpoint, the tunnel endpoint being for a corresponding tunnel connection between the data processing apparatus and the logically independent IP subnet, the tunnel endpoint being identified by a tunnel identifier, receiving tunnel packets through the tunnel, each tunnel packet encapsulating a payload packet, the payload packet including a packet source address and a packet destination address, the packet source address defining a source IP address and a source port number, the source IP address being an IP address assigned to a device in the logically independent subnet with which the corresponding tunnel connection is established, and the packet destination address defining a destination IP address to which the payload packet is addressed, generating a source identifier from the tunnel identifier and packet address, mapping the source identifier to a translated packet source address, and addressing the payload packet to the destination address using the translated packet source address. Other embodiments of this aspect include corresponding systems, apparatus, and computer programs, configured to perform the actions of the methods, encoded on computer storage devices.

In general, various aspects of the subject matter described in this specification can be embodied in methods that include the following actions a processing node: Generating the source identifier from the tunnel identifier and packet address comprises generating the source identifier from the tunnel identifier, source IP address, and source port number, and mapping the source identifier to the translated packet source address comprises generating, by the data processing apparatus, a new source IP address and a new port number, and mapping the source identifier to the new source IP address and the new port number. Generating the source identifier from the tunnel identifier and packet address comprises generating a new port number from the tunnel identifier, the source IP address and the source port number. Generating the new port number, wherein the new port number is an n-bit number, comprising concatenating the tunnel identifier, the source IP address, and the port number, and generating an n-bit hash of the concatenation of the tunnel identifier, the source IP address, and the port number. Generating the new port number, wherein the new port number is an n-bit number, comprising generating a modulo value from the tunnel identifier and a number quantifying the number of available IP addresses that the data processing apparatus can assign to an outgoing packet, concatenating the modulo value, the source IP address, and the port number, and generating an n-bit hash of the concatenation of the modulo value, the source IP address, and the port number. Generating a source identifier from the tunnel identifier and packet address comprises generating a tuple comprising the tunnel identifier, the source IP address, and the destination IP address, and mapping the source identifier to the translated packet source address comprises generating connection data defining an association of first and second sockets, the first socket defining a connection from an edge router that is assigned the source IP address to the data processing apparatus, and the second socket defining a connection from the data processing apparatus to a device at the destination IP address. Including the source IP address substituted for the IP address of the data processing apparatus in the second socket. Hashing the tuple, and indexing the connection data by the hash of the tuple. Generating the source identifier from the tunnel identifier and packet address comprises concatenating the tunnel identifier with the source port number. Including an IP address of an edge router connected to the data processing apparatus by the tunnel connection in the tunnel identifier for each tunnel endpoint. Generating, by the data processing apparatus, a unique n-bit number that is associated with an IP address of an edge router connected to the data processing apparatus by the tunnel connection.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
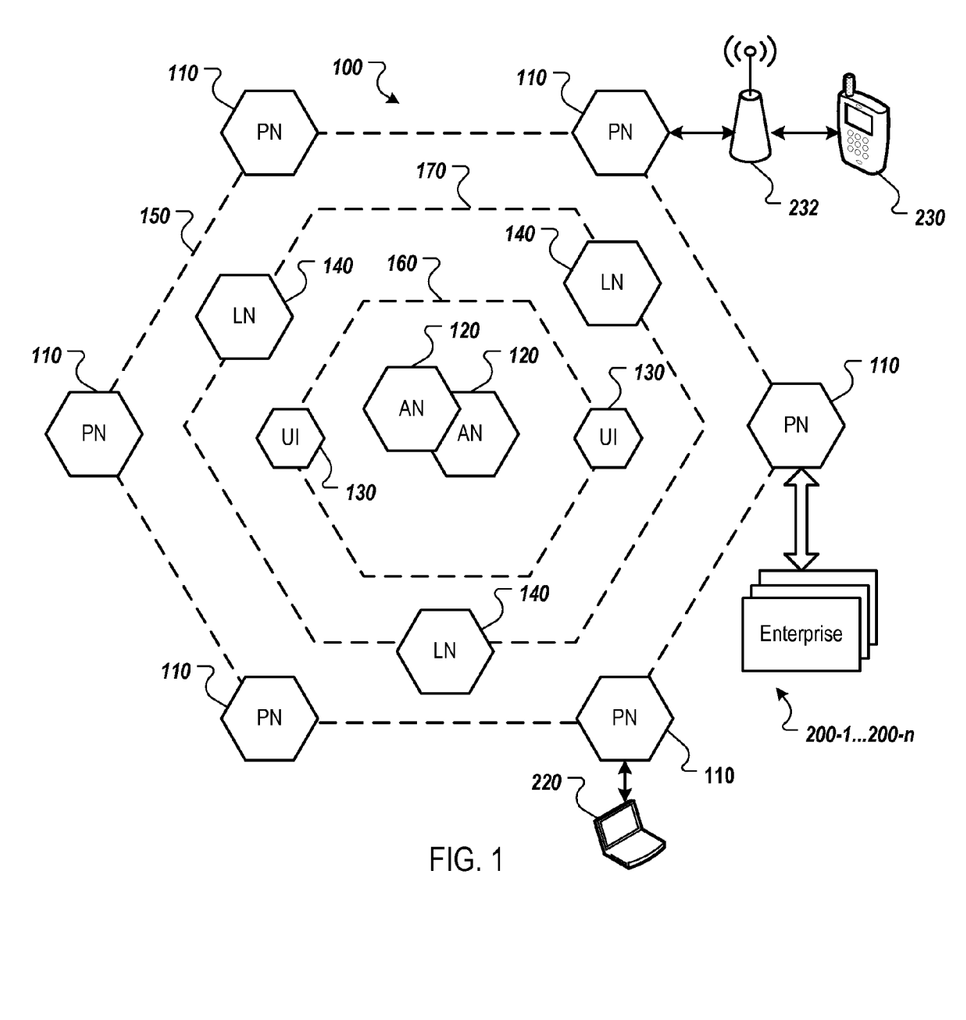
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprises 200-1 . . . 200-n, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is processed through a processing node 110.

Each processing node 110 can identify a threat classification for traffic, e.g., clean, spyware, malware, undesirable content, innocuous, unknown, etc. For example, the processing nodes 110 use data inspection engines to make these identifications. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines 117 and dictionaries for the processing nodes.

In some implementations, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

§2.0 Example Detailed System Architecture and Operation

Figure 2:
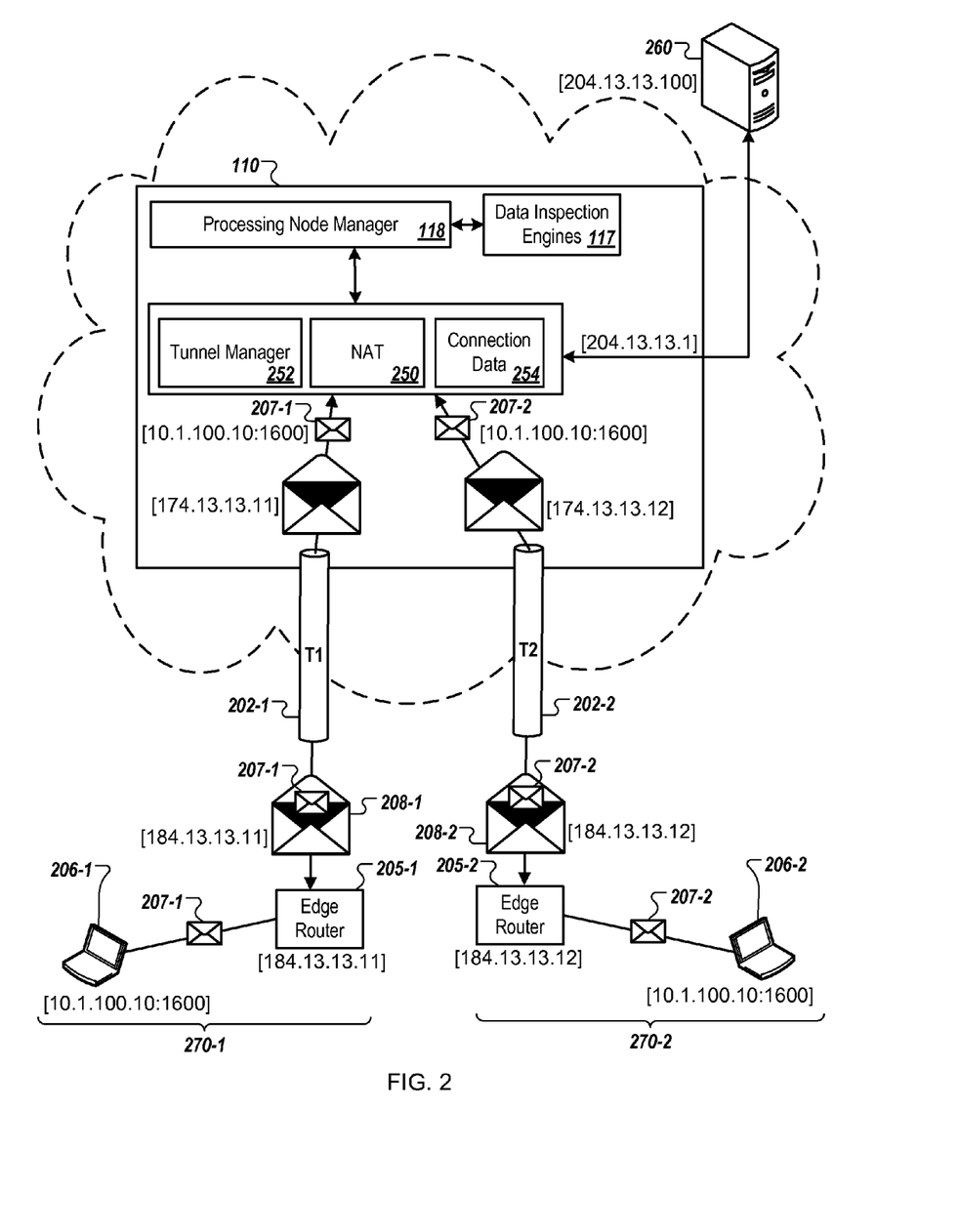
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110 is shown, there are many of processing nodes present in the system 100.

§2.1 Example Processing Node Architecture

In some implementations, the processing node 110 can include data inspection engines 117. The data inspection engines 117 can be configured to perform a threat detection processes to classify content items according to a threat classification for a corresponding threat. For example, the data inspection engines 117 can include a virus scanner engine that can classify a content item as infected or clean, a network URL filter that can classify a URL address as allowed or restricted, a data leakage protection (DLP) engine that can identify a content item as secure or leaking, and a dynamic content categorization (DCC) engine that can classify a content item as passed or failed.

The list of the data inspection engines 117 is illustrative only; many other data inspection engines 117 can also be used, as can multiple instances of data inspection engines 117, e.g., different type data leakage engines implementing different data leakage algorithms. The calling of any particular data inspection engine 117 can be predicated on the type of content item to be threat detected. For example, a URL request from the enterprise 200 may cause the processing node manager 118 to call only the URL filter engine.

In some implementations, traffic redirection can be used by multi-tenant cloud based web security systems to transport the customer traffic through cloud resident processing nodes (PNs) such as the processing node 110. As shown in FIG. 2, a tunnel 202-1 is established between an edge router 205-1 and the processing node 110, and a tunnel 202-2 is established between an edge router 205-2 and the processing node 110. In some implementations, the tunnels 202-1 and 202-2 may be established using the GRE protocol, or other tunneling protocols. The processing node 110 in turn implements a network address translation (NAT) module 250 to establish traffic flow between the processing node 110 and a server 260.

The reverse flow, from the server 260 to a client device 206-1 and a client device 206-2, is directed by performing reverse NAT, and identifying the tunnel 202-1 and 202-2 to which the flow must be associated. Generally speaking, GRE is a stateless protocol. However, when GRE is used in conjunction with a spoke-and-hub architecture, such as a multi-tenant architecture, some state information must be maintained to identify the tunnel 202-1 or 202-2. A tunnel manager 252 is included to provide functions associated with the maintenance of such state information. A connection data module 254 is included to maintain connection data structures. For example, the connection data module 254 may include lookup tables used by the NAT 250, or may include functions for performing source address and/or port mapping.

Referring to FIG. 2, two logically independent IP subnets (LIS) 270-1 and 270-2 are shown. The PN 110 receives IP packets 207-1 and 207-2 that have been encapsulated within tunnel packets 208-1 and 208-2 for transport through tunnels 202-1 and 202-2. The NAT 250 translates the packets' 207-1 and 207-2 addresses and forwards the packets 207-1 and 207-2 to the server 260. For example, the client device 206-1 with the IP address 10.1.100.10 and port 1600 sends the packet 207-1 to the server 260 by way of an edge router 205-1 and the PN 110. The edge router 205-1 has an IP address of 184.13.13.11. The edge router establishes the tunnel 202-1 with the PN 110. To perform the tunneling, the edge router 205-1 encapsulates the packet 207-1 as a payload within a tunnel packet 208-1. Similarly, an edge router 205-2 encapsulates the packet 207-2 from the client device 206-2 as a payload within a tunnel packet 208-2 for transport to the PN 110 through the tunnel 202-2.

When the tunnel packets 208-1 and 208-2 (e.g., GRE packets, tunneled TCP packets) arrive, the tunnel packets 208-1 and 208-2, along with their outer IP addresses, are removed to decapsulate the packets 207-1 and 207-2 thereby exposing their inner IP addresses. As illustrated, the inner IP address can be identical for the packets 207-1 and 207-2 arriving through the tunnels 202-1 and 202-2. If the packets' 207-1 and 207-2 source ports and destination addresses are the same, as shown in FIG. 2, then the packet 207-1 arriving through the tunnel 202-1 may be substantially indistinguishable from the packet 207-2 arriving through the tunnel 202-2. For example, the packets 207-1 and 207-2 both originate from the client devices 206-1 and 206-2 on separate networks (e.g., the LIS 270-1 and 270-2), both devices using the IP and port address of 10.1.100.10:1600. When the packets 207-1 and 207-2 arrive at the PN 110, the tunnel packets 208-1 and 208-2 are removed, leaving the PN 110 to handle the routing of the two separate packets 207-1 and 207-2, both having the same source IP and port address (e.g., 10.1.100.10:1600) and destination address (e.g., the server 260, IP 204.13.13.100).

In some implementations, this situation may arise when multiple organizations using overlapping private IP address ranges (e.g., two or more internal LANs using 10.1.100.xxx addresses) collapse their edge routers 205-1 and 205-2 and/or the NAT device 250 to a single point, such that their private IP addresses become impossible to distinguish. In the example of multi-tenant cloud based systems, these systems generally collapse the NAT 250 and firewall functionality to a single converging point in the cloud so that each tenant (enterprise) need not perform NAT and firewalling operations in the enterprise premise. However, this gives rise to a situation where overlaps in the private IP address space amongst organizations may be exposed and conflicted.

The example processing node 110 provides multiple solutions to the problem of overlapping IP address space for tunneled connections. In some implementations, a source NAT may be performed prior to transferring the packets 207-1 and 207-2 to the tunnel manager 252 which establishes and maintains state information for TCP and UDP traffic. For example, the NAT 250 may change the source IP and source port of the incoming packets 207-1 and 207-2 with a new IP and port that is substantially unique. A tunnel ID may be generated per tunnel and used in conjunction with the private source IP and source port of the encapsulated packet to disambiguate between the packets. Alternatively, a 16 bit tunnel ID and 16 bit GRE key may be used as an identifier instead of the source IP of the encapsulated packet. When the response packets from the server arrive, these packets are sent through the appropriate tunnels, based on the NATed IP information. These solutions are discussed further in the description of FIGS. 3 and 4.

In other implementations, the overlapping IP address space problem may be addressed by performing a source port MAP which maps the 16 bit port number into a 32 bit port number that is unique. The higher order 16 bits of the port number are for flow identification purposes only and are not used in the packet transfer. The consistency and uniqueness of the port map is maintained by generating the same port number for the same flow and is made unique to the flow. This solution is discussed further in the description of FIGS. 5 and 6. In yet other implementations, the overlapping IP address space issue may be solved by performing a combinational lookup that identifies a state maintaining data structure (e.g., the connection data structure, the socket) by using a combination of the tunnel source IP, client IP (private IP) and the destination IP along with the source and destination ports. This solution is discussed further in the description of FIGS. 7 and 8.

In some implementations, the firewalling and NATing operations that are generally performed in the enterprise premise can now be performed at the multi-tenant cloud based gateway node, the PN 110. For example, the identity of the client devices 206-1 and 206-2 can be recorded using unique identifiers, and can be used to enforce policies specific to the client devices 206-1 and 206-2. This architecture can also support common perimeter functions of NAT and firewalling to be performed in the PN 110, thereby saving the number of devices that each organization needs to maintain. In some implementations, existing firewalling rules can be translated due to the presence of the private IP addresses at the cloud based PN 110. In some examples, this scheme can have an advantage that the client computing devices 206-1 and 206-2 can be identified using a hierarchical IP addressing scheme in which the private IP of the client is qualified by a router IP which establishes the tunnels 2021- and 202-2 to the PN 110.

To reiterate, there are several different aspects include, but are not limited to: methods of detecting a client initiated flow even when different flows have common client IP address; methods of uniquely identifying the client computing devices 206-1 and 206-2 and associating users with the devices; systems for remote inspection of the client computing devices 206-1 and 206-2 when devices are connected to the internet through a cloud based security provisioning device; systems for rating the risks of the client devices 206-1 and 206-2 based on the inspection of the devices; and systems for enforcing security policies based on the risk index. In some implementations, these aspects can be used individually or in various combinations to enhance the security of the cloud based security services.

In some implementations, the PN 110 can be used by Internet service providers (ISPs) where each customer may have their own private network and two or more customers may have the same private address. In such an example, the packets 207-1 and 207-2 may be tunneled using tunneling protocols such as PPTP, L2TP, or L2F to a peer PPP session. Using such an example, the need for separate PPP session, which identifies the flow, can be avoided. In addition, the privacy of data flows may be maintained using such simple tunneling protocols.

§3.0 Overlapping IP Network Address Translation Architecture

Figure 3:
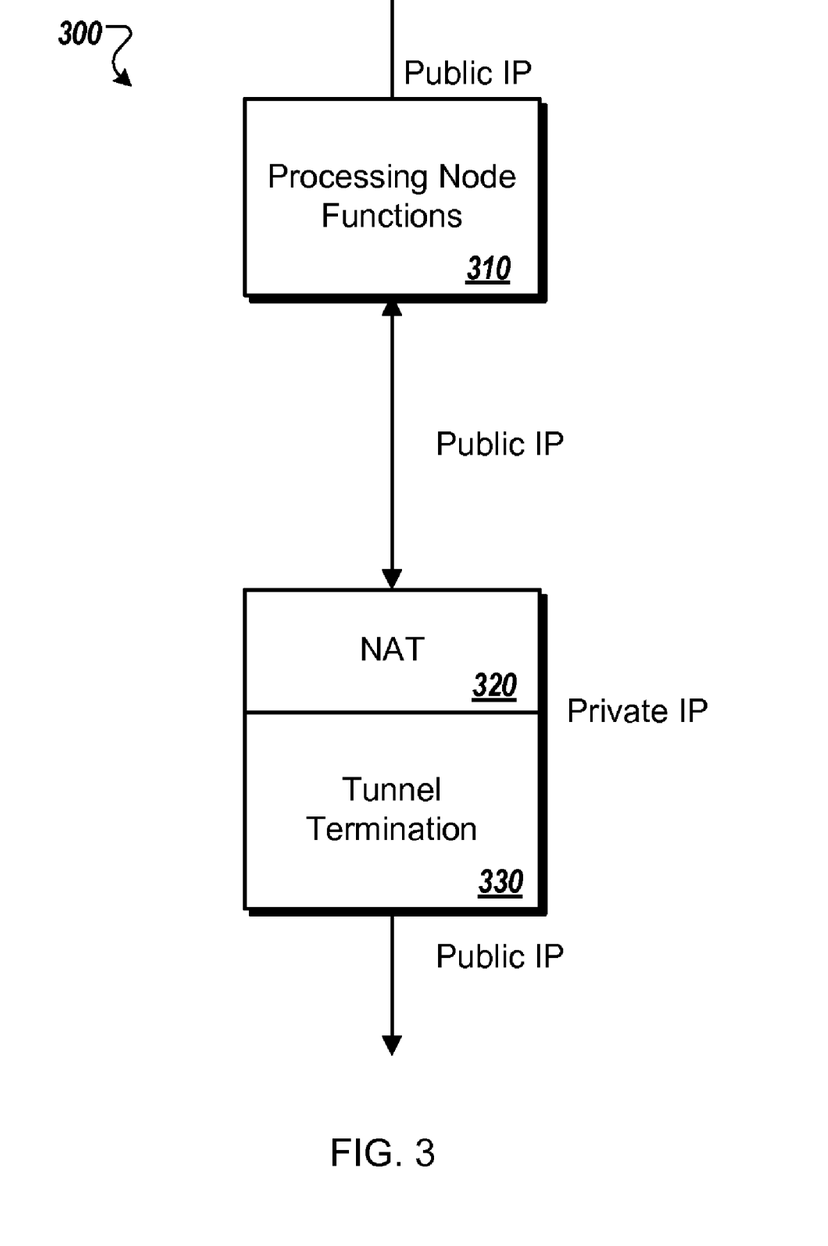
FIG. 3 is a block diagram of a network address translation architecture that handles overlapping IP addresses in logically independent sub-networks.

FIG. 3 is a block diagram of a network address translation architecture 300 that handles overlapping IP addresses in logically independent sub-networks. In some implementations, the architecture 300 may be used by the PN 110 of FIGS. 1 and 2. The architecture 300 includes a processing node (PN) functions module 310, a NAT 320, and a tunnel termination module 330. In general, packets may be identified at the tunnel termination module 330 by the quintuple <source IP, destination IP, source port, destination port, protocol>. The architecture 300 extends the packet identification to <tunnel id, source IP, destination IP, source port, destination port, protocol> before being provided to the processing node functions module 310, which may perform firewalling, virus scanning, filtering, or other security functions.

Referring to the example of FIG. 3, the private IP address and source port are mapped into a public IP address and port number that would be unique, based on the tunnel id (e.g., the tunnel IP address). Mapping of the private IP address and source port into a public IP address may be performed in various ways. In some implementations, the mapping may be performed using a lookup table which maps <tunnel id, source IP, source port> into a new <source IP, source port> and the source IP and port are assigned uniquely. In some implementations, the map entry can be removed when the flow is terminated. In some implementations, the flow termination may not be identified. For example, a flow of data from a client device to the tunnel termination module 330 may be interrupted unexpectedly (e.g., the tunnel connection is severed, the client device loses power or crashes). In such implementations, the map entry may be deleted automatically. For example, the map entry may be deleted after a timeout period within which no communications have occurred, or the map entry may be put into a first in first out (FIFO) collection of map entries that are progressively recycled as new map entries are needed.

§3.1 Example Processes for Translating Overlapping IP Addresses

Figure 4:
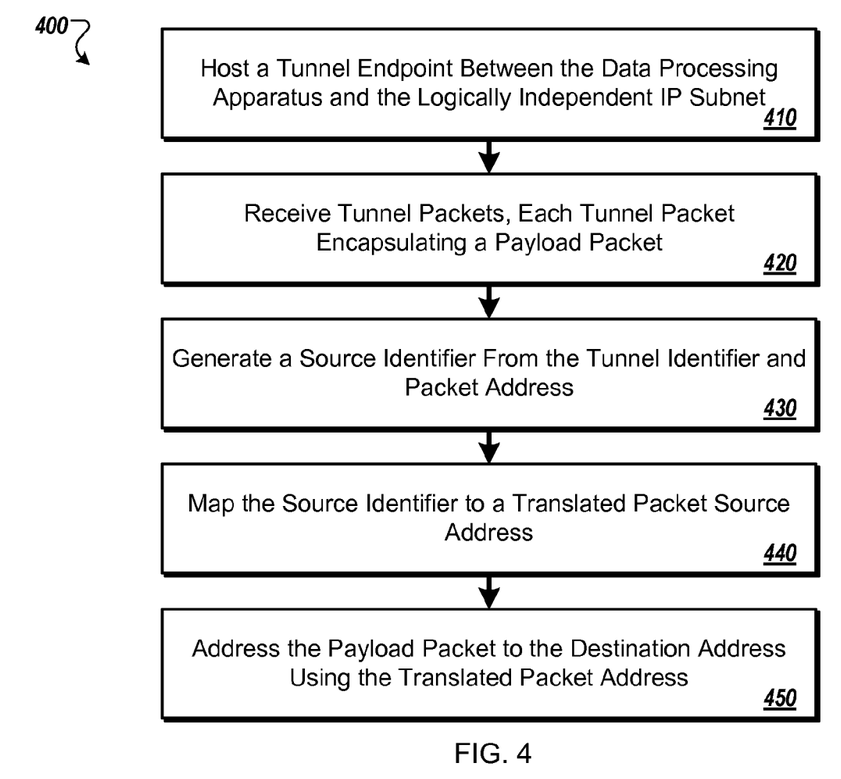
FIG. 4 is a flow diagram of an example process for handling overlapping IP addresses in logically independent sub-networks.

FIG. 4 is a flow diagram of an example process 400 for handling overlapping IP addresses in logically independent sub-networks. The process 400 can, for example, be implemented by a data processing apparatus external to a collection of logically independent internet protocol (IP) subnets, each of the data processing apparatus including memory stores in data communication with the data processing apparatus and storing computer-readable instructions executable by the data processing apparatus, and that upon execution cause the data processing apparatus to perform the operations of the process 400. For example, the process 400 may be implemented by the PN 110 of FIGS. 1 and 2, or in other systems having distributed address translation architecture. The steps shown in FIG. 4 are each processes that can be executed independently and concurrently as appropriate.

For each logically independent subnet, the process 400 hosts a tunnel endpoint between a data processing apparatus and a logically independent IP subnet (410). For example, the tunnel 202-1 may communicably connect the edge router 205-1 with the PN 110. Tunnel packets are received wherein each tunnel packet encapsulates a payload packet (420), the payload packet including a packet source address and a packet destination address wherein the packet source address defines a source IP address and a source port number, the source IP address being an IP address assigned to a device in the logically independent subnet with which the corresponding tunnel connection is established, and wherein the packet destination IP address defines a destination IP address to which the payload packet is addressed. For example, the tunnel packet 208-1 of FIG. 2 encapsulates the packet 207-1 during transport through the tunnel 202-1.

A source identifier is generated from the tunnel identifier and the packet's address (430). For example, the IP address of the edge router 205-1 (e.g., 184.13.13.11) and the packet's 207-1 address (e.g., 10.1.100.10) may be used together as an identifier of the client device 206-1. The source identifier is then mapped to a translated packet source address (440). For example, the NAT 250 may map the source identifier to the IP address assigned to the PN 110 (e.g., 204.13.13.1) at port number (e.g., a number between 0 and 65535, such as 200). The payload packet is then addressed to the destination address using the packet destination address (450). For example, the NAT 250 may give the packet 207-1 the source address 204.13.13.1:1200, and then send the packet 207-1 to the server 260 at IP address 204.13.13.100.

§3.2 Example Processes for Stateless Network Addresses Translation

Figure 5:
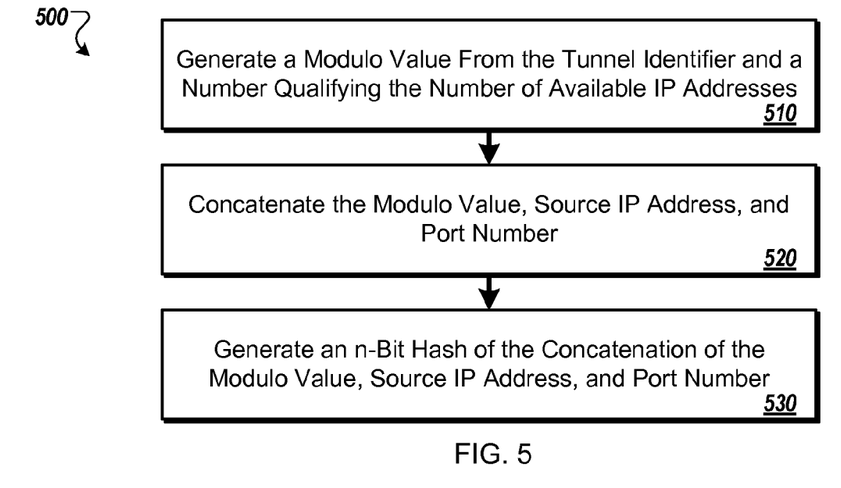
FIG. 5 is a flow diagram of an example process for mapping addresses to have a stateless network address translation.

FIG. 5 is a flow diagram of an example process 500 for mapping addresses to have a stateless network address translation. The process 500 can, for example, be implemented by the PN 110 of FIGS. 1 and 2, or in other systems having distributed address translation architecture. The steps shown in FIG. 5 are each processes that can be executed independently and concurrently as appropriate.

In some implementations, the process 500 derives the source port and IP address from the <tunnel id, source IP, source port> tuples. In the processes 500, a modulo value is generated from the identifier of the tunnel used to transport the packet. The range of the number is determined by the number of available IP addresses that the data processing apparatus can assign to an outgoing packet (510). For example, a fixed set of public IPs may be used and the mapped packet IP address may be selected based on the mapping of the tunnel id to the public IP. In an example where there are 16 public IP addresses available, modulo 16 of the tunnel id may be used as a selector function to select the public IP. For example, the tunnel 207-1 can be identified by the IP address of the edge router 205-1 (e.g., 184.13.13.11). The value of the fourth octet of the address (e.g., 11) can be MOD-ed (e.g., 11 mod 16=11) to determine that the packet should be mapped to the 11th available address in the collection of 16 public IP addresses.

In some implementations, for each IP address, the system can map up to $2^{16}$ flows. The number of IP addresses available determines the number of concurrent flows that can be supported. In some implementations, a number of flows equal to the number of available IP addresses can be used, as described above. In other implementations, as described below, a source port may be used in the mapping. For example, a source port may be availed by using the tunnel id, source IP and source port. For example, the tunnel ID can be a 16 bit number providing 65535 simultaneous tunnels per PN, and the source IP and port can be 32 and 16 bits wide, respectively. In some examples, a 16 bit port number is derived from the 64-bit number without incurring duplicates.

The process 500 then concatenates the modulo value, the source IP address, and the port number (520), and then generates an n-bit hash of the concatenation of the modulo value, the source IP address, and the port number (530). Although multiple methods may be used for its derivation, we show an example algorithm to demonstrate the derivation of source port and source IP. For example, let <t, i, p> denote the tunnel id, source IP and source port in the flow. The 64-bit number that is obtained by concatenating these three entities is denoted as t.i.p where the periods (.) denote a concatenation operation. The derived IP address and port are denoted by <ni, np>, where ni is the NATed IP and np is the NATed port.

K=t mod N (where N is the number of available public IPs)
np=CRC16(K.i.p)
ni=IP[K]

Or, using the numbers described in previous examples, and given a collection of sixteen public IP addresses 204.13.13.0 to 204.13.13.15 where the eleventh (starting from zero) address is 204.13.13.11: Assume a CRC-16 Polynomial $D^{16}$+

$D^{15}+D^2+1$ which is used to generate the CRC-16 remainder. 0x018005 is hex representation of the CRC generating polynomial.

<t, i, p>=<11, 10.1.100.12, 1200>=<0x000B, 0x0A01640C, 0x04B0>

K=11 mod 16=11dec=0x0B

K. i. p=<0x000B, 0x0A01640C, 0x04B0> np=CRC16(0x000B0A01640C04B0)=0xF080=61568 ni=IP[11]=204.13.13.11

Therefore in this example, the packet's address may be mapped to 204.13.13.11:61568. In some implementations, the PN may cache the mapped IP and mapped port address along with the tunnel identifier, source IP address and source port, in order to perform reverse NAT upon packets arriving from the network. In some implementations, some, all, or none of the information used to perform reverse NAT is stored in the associated sockets. In some implementations, other methods may use the tunnel ID as fictitious port number.

§3.3 Example Processes for Port Based Network Addresses Translation

Figure 6:
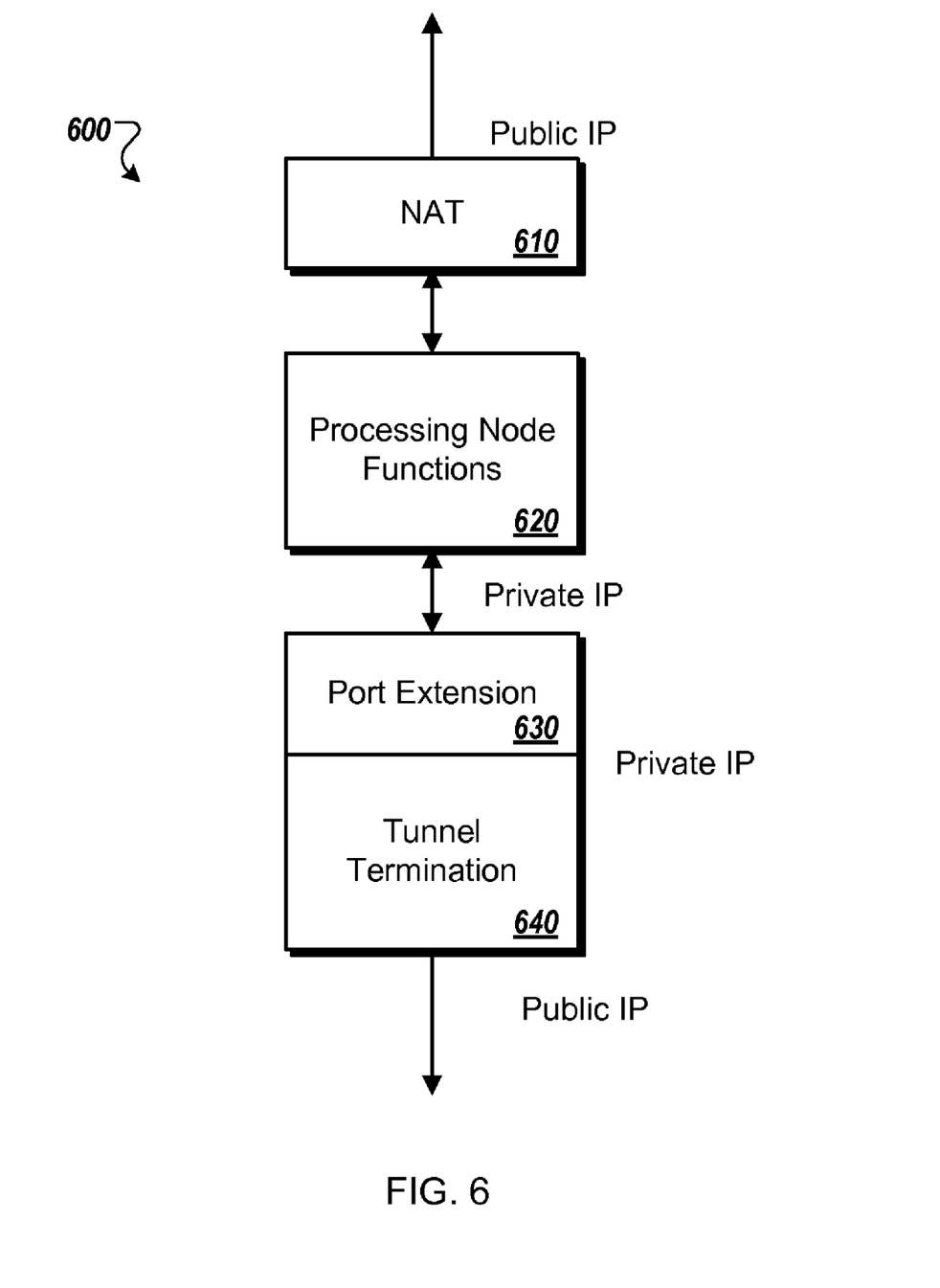
FIG. 6 is a block diagram of a network address translation architecture that uses an extension to a port number.

FIG. 6 is a block diagram of a network address translation architecture 600 that uses an extension to a port number. The architecture 600 can, for example, be implemented by the PN 110 of FIGS. 1 and 2, or in other systems having distributed address translation architecture.

The architecture 600 includes a NAT 610, a PN functions module 620, a port extension module 630, and a tunnel termination module 640. Generally speaking, an incoming source port is augmented with a value (e.g., a 16-bit tunnel ID) to form a new (e.g., 32-bit) port number so that the tuple <source IP, source port, destination IP, destination port> is unique. In some implementations, the uniqueness can be achieved through the upper 16 bits of the port number which can be set to the tunnel ID. Hence the tuple <tunnel ID, source IP, source port, destination IP, destination port> can specify the flow. In some implementations, the port number may be inserted by the tunnel termination module 640 so that the functionality of the PN functions module 620 can remain substantially unchanged.

The tunnel termination module 640 is an endpoint of a tunnel between a PN and a client network. For example, the tunnel 202-1 of FIG. 2 may connect from the edge router 205-1 to the PN 110 at the termination module 640. Packets arriving at the tunnel termination module 640 carry the source IP address of the client device, such as 184.13.13.11 in the example of the tunnel packet 208-1. The tunnel termination module 630 decapsulates the packets to expose their contents, including their private IP address and port number. In the example of the tunnel packet 208-1, the tunnel termination module 630 can unwrap the tunnel packet 208-1 to reveal the packet's 207-1 the source address and port number 10.1.100.10:1600.

The port extension module 630 modifies the port number by augmenting it with another number, such as a number that identifies the tunnel. In some implementations, the tunnel ID and the port number may be a 16-bit numbers (e.g., a number between 0 and 65535, or 0x0 and 0xFFFF). The tunnel ID can be added to or concatenated with the port number, to produce a new value that can be stored as a 32-bit value. For example, using 16-bit tunnel identifiers and 16-bit port numbers, the tunnel termination module 640 can uniquely identify 65536 tunnels, each of which can carry 65536 substantially unique simultaneous flows. In a more specific example, the tunnel 202-1 may carry an identifier of 123 (0x007B), and this identifier may be concatenated with the packet's 207-1 port number (e.g., 16, 0x0010) to produce a new port number (e.g., 0x007B0010, or 8060944) that can be used with the source IP address (e.g., 10.1.100.10:8060944).

However, only the 16 bits of the port number would be used in the packet that is sent out. Accordingly, packets that arrive with 16 bit port numbers need to be made unique to identify the socket attached to the 32 bit port number.

The PN functions node 620 performs various network functions on packets flowing between the port extension module 630 and the NAT 610. Examples of PN functions can include filtering, firewalling, SPI, virus scanning, traffic analysis, authentication, threat identification, or other network functions. The NAT 610 performs network address translation. In some implementations, the NAT 610 can process a packet to translate its private IP address and port number, including concatenated port number, to a public IP address and port number. For example, the packet 207-1 may be associated with the private IP address 10.1.100.10 and the concatenated port number 8060944. The NAT 610 can map the private address 10.1.100.10:8060944 to the PN's 110 public IP address 204.13.13.1 at a selected port. In some implementations, the selection of the port associated with the public IP address may be made such that the port number is compatible with common IP clients (e.g., a 16-bit number). For example, the NAT may assign the public address 204.13.13.1:65535 to traffic originating from the client device 206-1, such as the packet 207-1, using the modified private IP address 10.1.100.10:8060944.

§3.4 Example Processes for Table Mapped Network Address Translation

Figure 7:
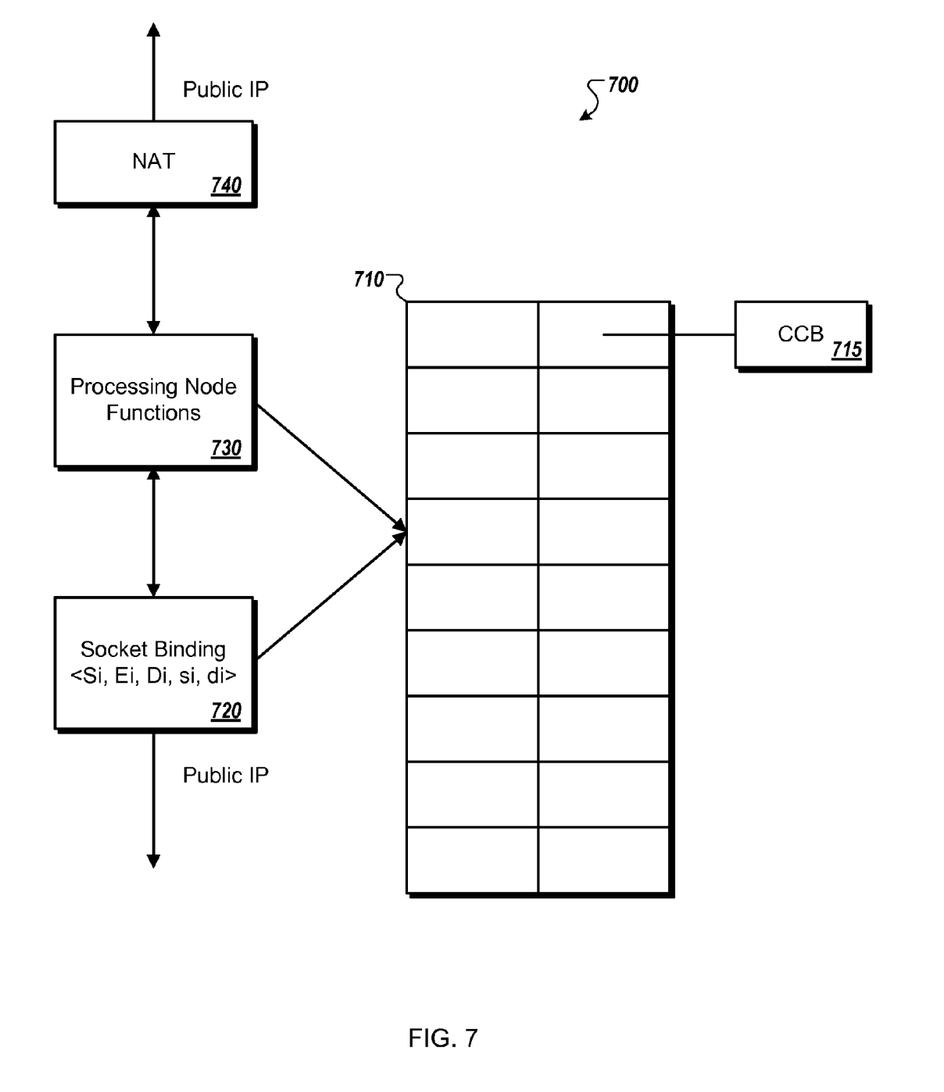
FIG. 7 is a block diagram of a network address translation architecture that associates forward and reverse flows in a connection table.

FIG. 7 is a block diagram of a network address translation architecture 700 that associates forward and reverse flows in a connection table 710. The architecture 600 can, for example, be implemented by the PN 110 of FIGS. 1 and 2, or in other systems having distributed address translation architecture.

In general, the architecture enables various types of operations including, retrieving a connection on which the flow is recorded given an encapsulated tuple, and retrieving the same connection as that would have been picked by the encapsulated tuple given an unencapsulated tuple. In some implementations, the connection table 700 can be partitioned on a per-protocol basis. For example, the first operation may select the specific connection table based on the protocol and the subsequent operation may identify the connection within the table. Using this approach, both TCP and UDP flows may be addressed. UDP and TCP flows may come from same source IP, tunnel ID and source port numbers. By differentiating through the protocol, same mapped IP address and port number can exist in both TCP and UDP flows at the same time.

A socket binding module 720 processes packets to extract information such as their source IP, destination IP, edge router IP, source port, and destination port. The extracted information is used by the socket binding module 720 to construct a tuple that is stored as a CCB, such as the CCB 715, and to search the connection table 710 to find a corresponding tuple. In some implementations, the corresponding tuple that includes information that can be used to address flows between the PN and one or more destinations.

A PN functions node 730 can also perform lookups in the CCB table. For example, the PN functions node 730 may perform network functions such as filtering or filewalling, and the PN functions node 730 may use port and address information extracted from the packet to perform PN functions on a per-server, per-enterprise, or per-client basis.

With a tunneled flow there are two quintuples, the outer tuple and the inner tuple. The outer tuple creates a flow from the edge router to the PN, and the inner tuple is used to create the flow from the source to the edge router and from PN to the destination. For example, the outer tuple may enable packets to flow between the edge router 205-1 and the PN 110 of FIG. 2, and the inner tuple may enable packets to flow between the client device 206-1 and the edge router 205-1, and between the PN 110 and the server 260.

In one example, D1, D2, . . . , Dm can represent a collection of destination devices, S1, S2, . . . , Sn can represent a collection of client devices, P1, P2, . . . , Po can represent a collection of PNs, and E1, E2, . . . , Ek can represent a collection of edge routers. Destination ports can be represented by d1, d2, . . . , di, and source ports can be represented as s1, s2, . . . , sj.

<S1, D1, s1, d1, TCP> can represent the originating tuple. In some examples, this may be the flow created from the source and gets modified at the edge router. Therefore, <E1, P1, <S1, D1, s1, d1, TCP>> can be the tuple corresponding to the encapsulated flow. Similarly, from another organization, there may be a similar flow, characterized by the encapsulated tuple <E2, P1, <S1, D1, s1, d1, TCP>> that may be the tuple corresponding to the encapsulated flow through the edge router E2. These are two similar flows, coming from client devices with identical addresses and addressed to identical, but flowing through different edge devices. The different identities of the edge devices can be captured in the flow through the device IP addresses E1 and E2.

An example reverse flow (e.g., the flow from destination to source) may be characterized by similar tuples with source and destinations interchanged. Similarly, the reverse flow interchanges the E and P as the encapsulation originates from PNs and goes towards the edge routers. For example, the connection data structure can be indexed by a hash table. In the combinational lookup scheme, a method can be to use <S1, E1, D1> as the tuple used to compute the hash of the table address. In this example, the value of P1 may be selected such that P1=E1, so that the tuple <S1, E1, D1> and <S1, P1, D1> may both be substantially the same. In this example, P1 can advertise this route to E1 so that packets can be routed through P1. This example also enables the flow to migrate to another PN, with the same lookup mechanism. In some implementations, variations of the described technique may include the source and destination port numbers. For example, <S1, E1, D1, s1, d1> may be used to create the hash value to lookup the connection table 710 from the encapsulated connection.

In implementations that use certain protocols such as ICMP, GRE, the port numbers may be absent. Using the tunnel ID as a qualifier, the number of devices is increased to by the size of the tunnel ID (usually 32-bit denoting the public IP address of the tunnel source IP). In some implementations, ISPs can use this technique since each ISP point of presence can substantially support the full private IP space without having to have a public IP address assigned to the customer device. For example, the number of customers that can be supported within one POP is the substantially the full size of the private IP address space. In some implementations, the private IP addresses may either be statically assigned or can be dynamically assigned.

Additional variations are possible to perform the lookup. In some implementations, the lookup functions may be with a tunnel ID generated from the packet parameters. The ID may be used as an index to the hash table to lookup a connection data structure where the tunnel IP, client IP and Server IP are recorded. In another example, a combination of GRE Key along with the GRE source IP (e.g., the tunnel source IP) can be used as the hash key to perform the hash lookup.

The NAT 740 translates the addresses bound by the socket binding module 720 to convert between addresses and ports used within the PN and those used to communicate with destination devices. In some implementations, the network address translation may be performed using an IP address owned by the PN (e.g., VIP NAT), or may use the public IP of an edge router (e.g., tenant IP NAT). In the latter method, substantially all paths to the router can be advertised to be through the PN. An example translation table is illustrated below.

| Tunnel | VIP NAT | Tenant IP NAT |
|---|---|---|
| T1 | 204.13.13.2:xxx | 184.13.13.11:srcport |
| T2 | 204.13.13.3:xxx | 184.13.13.12:srcport |

In some implementations, the reverse flow can be directed to the correct tunnel by looking up the table of NATed entries. This technique implements a substantially unique number for identifying the devices, referred here in as a flow identification number, which can be a 128-bit number which identifies the flow. The flow ID may be created by concatenating a 64-bit device ID which is a combination of source IP and Edge router IP, and a 64-bit transport ID which is a combination of source port, destination port, destination IP. For example, <S1, E1, s1, d1, D1> can form the flow ID. In some implementations, the flow ID may be stored as part of the connection, so that on retrieving the connection the reverse flow may be established. In some embodiments, instead of identifying the flow, the number may be used to identify the device. For example, <S1, E1, D1, s1, d1> may form the flow ID and the lower 32 bits can be ignored while identifying the device.

In some implementations, a source port numbers may be selected so that the resulting hash value will be substantially the same. For example, <S1, E1, D1, s1, d1> may be used to create the hash value to lookup the connection table from the encapsulated connection. The tuple <P1, E1, D1, sj, d1> may be used to pick the same tuple if:

Hash(<S1, E1, D1, s1, d1>)=Hash(<P1, E1, D1, sj, d1>)

In some implementations, DNS names (e.g., N1, N2, . . . Nk) may be associated with the IP addresses E1, E2, . . . Ek. By maintaining the name association, each of the private IP addresses associated with point of presence may be made routable, hence services may be hosted in the customer locations without having to have publically routable IP addresses.

In some implementations, the IP addresses Ei and Pi can be substantially unique, therefore they can be managed by a global authority node. Each customer device thereby may be indexed using a globally unique number. In some implementations, the substantially unique identifier may allow customers to keep their private IP addresses, even when the customers move from one ISP to another. For example, a customer may keep their IP address in a way that is similar to the ability of telephone customers to maintain (e.g., port) their phone numbers when the customers move from one provider to another.

§3.5 Example Process for Associating Forward and Reverse Flows

Figure 8:
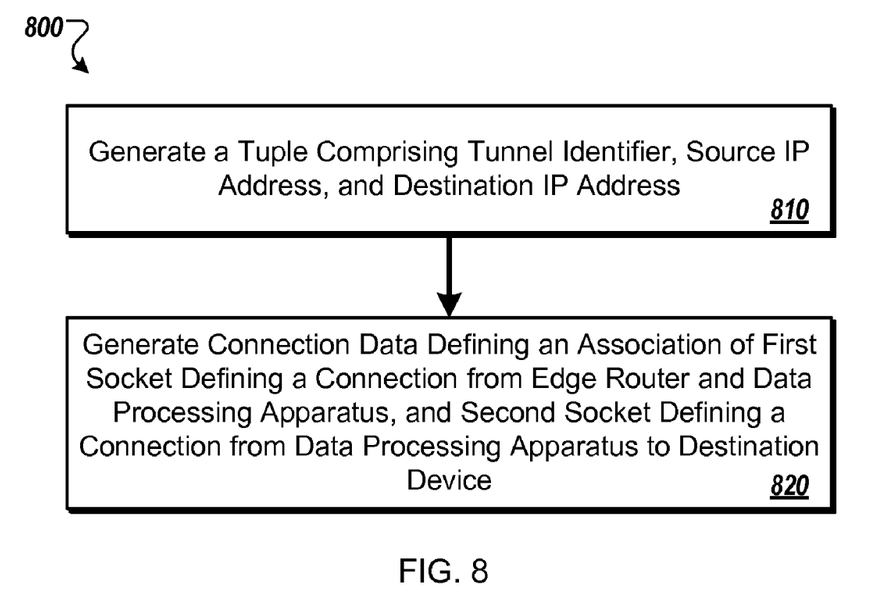
FIG. 8 is a flow diagram of an example process for associating forward and reverse flows.

FIG. 8 is a flow diagram of an example process 800 for associating forward and reverse flows. The process 800 can, for example, be implemented by the PN 110 of FIGS. 1 and 2, or in other systems having a distributed address translation architecture. The steps shown in FIG. 8 are each processes that can be executed independently and concurrently as appropriate.

The process 800 generates a tuple comprising a tunnel identifier, a source IP address, and a destination IP address (810). The process 800 then generates connection data defining an association of a first socket defining a connection from an edge router and a data processing apparatus, and a second socket defining a connection from a data processing apparatus to a destination device (820). For example, the connection data may describe a connection between the edge router 205-1 and the PN 110 of FIG. 2, and another connection between the PN 110 and the server 260.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a data processing apparatus external to a plurality of logically independent internet protocol (IP) subnets;
    a memory store in data communication with the data processing apparatus and storing computer-readable instructions executable by the data processing apparatus and that upon execution cause the data processing apparatus to perform operations comprising:
    for each logically independent IP subnet:
        hosting a tunnel endpoint, the tunnel endpoint being for a corresponding tunnel connection between the data processing apparatus and the logically independent IP subnet, the tunnel endpoint being identified by a tunnel identifier;
        receiving tunnel packets through the tunnel, each tunnel packet encapsulating a payload packet, the payload packet including a packet source address and a packet destination address, the packet source address defining a source IP address and a source port number, the source IP address being an IP address assigned to a device in the logically independent subnet with which the corresponding tunnel connection is established, and the packet destination address defining a destination IP address to which the payload packet is addressed;
        generating a source identifier from the tunnel identifier and packet address;
        mapping the source identifier to a translated packet source address; and
        addressing the payload packet to the destination address using the translated packet source address;
    wherein:
    generating the source identifier from the tunnel identifier and packet address comprises generating the source identifier from the tunnel identifier, source IP address, and source port number; and
    mapping the source identifier to the translated packet source address comprises:
        generating, by the data processing apparatus, a new source IP address and a new port number; and
        mapping the source identifier to the new source IP address and the new port number.

2. The system of claim 1, wherein generating the source identifier from the tunnel identifier and packet address comprises generating a new port number from the tunnel identifier, the source IP address and the source port number.

3. The system of claim 2, wherein the new port number is an n-bit number, and generating the new port number comprises:
    concatenating the tunnel identifier, the source IP address, and the port number; and
    generating an n-bit hash of the concatenation of the tunnel identifier, the source IP address, and the port number.

4. The system of claim 2, wherein the new port number is an n-bit number, and generating the new port number comprises:
    generating a modulo value from the tunnel identifier and a number quantifying the number of available IP addresses that the data processing apparatus can assign to an outgoing packet;
    concatenating the modulo value, the source IP address, and the port number; and
    generating an n-bit hash of the concatenation of the modulo value, the source IP address, and the port number.

5. The system of claim 1, wherein:
    generating a source identifier from the tunnel identifier and packet address comprises generating a tuple comprising the tunnel identifier, the source IP address, and the destination IP address; and
    mapping the source identifier to the translated packet source address comprises generating connection data defining an association of first and second sockets, the first socket defining a connection from an edge router that is assigned the source IP address to the data processing apparatus, and the second socket defining a connection from the data processing apparatus to a device at the destination IP address.

6. The system of claim 5, wherein the second socket includes the source IP address substituted for the IP address of the data processing apparatus.

7. The system of claim 6, further comprising:
hashing the tuple; and
indexing the connection data by the hash of the tuple.

8. The system of claim 1, wherein generating the source identifier from the tunnel identifier and packet address comprises concatenating the tunnel identifier with the source port number.

9. The system of claim 1, wherein the tunnel identifier for each tunnel endpoint comprises an IP address of an edge router connected to the data processing apparatus by the tunnel connection.

10. The system of claim 1, wherein the tunnel identifier for each tunnel endpoint comprises a unique n-bit number generated by the data processing apparatus and is associated with an IP address of an edge router connected to the data processing apparatus by the tunnel connection.

11. A method performed by a data processing apparatus external to a plurality of logically independent internet protocol (IP) subnets, comprising:
for each logically independent IP subnet:
hosting a tunnel endpoint, the tunnel endpoint being for a corresponding tunnel connection between the data processing apparatus and the logically independent IP subnet, the tunnel endpoint being identified by a tunnel identifier;
receiving tunnel packets through the tunnel, each tunnel packet encapsulating a payload packet, the payload packet including a packet source address and a packet destination address, the packet source address defining a source IP address and a source port number, the source IP address being an IP address assigned to a device in the logically independent subnet with which the corresponding tunnel connection is established, and the packet destination address defining a destination IP address to which the payload packet is addressed;
generating a source identifier from the tunnel identifier and packet address;
mapping the source identifier to a translated packet source address; and
addressing the payload packet to the destination address using the translated packet source address;
wherein:
generating the source identifier from the tunnel identifier and packet address comprises generating the source identifier from the tunnel identifier, source IP address, and source port number; and
mapping the source identifier to the translated packet source address comprises:
generating, by the data processing apparatus, a new source IP address and a new port number; and
mapping the source identifier to the new source IP address and the new port number.

12. The method of claim 11, wherein generating the source identifier from the tunnel identifier and packet address comprises generating a new port number from the tunnel identifier, the source IP address and the source port number.

13. The method of claim 12, wherein the new port number is an n-bit number, and generating the new port number comprises:

concatenating the tunnel identifier, the source IP address, and the port number; and
generating an n-bit hash of the concatenation of the tunnel identifier, the source IP address, and the port number.

14. The method of claim 12, wherein the new port number is an n-bit number, and generating the new port number comprises:
generating a modulo value from the tunnel identifier and a number quantifying the number of available IP addresses that the data processing apparatus can assign to an outgoing packet;
concatenating the modulo value, the source IP address, and the port number; and
generating an n-bit hash of the concatenation of the modulo value, the source IP address, and the port number.

15. The method of claim 11, wherein:
generating a source identifier from the tunnel identifier and packet address comprises generating a tuple comprising the tunnel identifier, the source IP address, and the destination IP address; and
mapping the source identifier to the translated packet source address comprises generating connection data defining an association of first and second sockets, the first socket defining a connection from an edge router that is assigned the source IP address to the data processing apparatus, and the second socket defining a connection from the data processing apparatus to a device at the destination IP address.

16. The method of claim 15, wherein the second socket includes the source IP address substituted for the IP address of the data processing apparatus.

17. The method of claim 15, further comprising:
hashing the tuple; and
indexing the connection data by the hash of the tuple.

18. The method of claim 11, wherein generating the source identifier from the tunnel identifier and packet address comprises concatenating the tunnel identifier with the source port number.

19. The method of claim 11, wherein the tunnel identifier for each tunnel endpoint comprises an IP address of an edge router connected to the data processing apparatus by the tunnel connection.

20. The method of claim 11, wherein the tunnel identifier for each tunnel endpoint comprises a unique n-bit number generated by the data processing apparatus and is associated with an IP address of an edge router connected to the data processing apparatus by the tunnel connection.

21. A system, comprising:
a data processing apparatus external to a plurality of logically independent internet protocol (IP) subnets;
a memory store in data communication with the data processing apparatus and storing computer-readable instructions executable by the data processing apparatus and that upon execution cause the data processing apparatus to perform operations comprising:
for each logically independent IP subnet:
hosting a tunnel endpoint, the tunnel endpoint being for a corresponding tunnel connection between the data processing apparatus and the logically independent IP subnet, the tunnel endpoint being identified by a tunnel identifier;
receiving tunnel packets through the tunnel, each tunnel packet encapsulating a payload packet, the payload packet including a packet source address and a packet destination address, the packet source address defining a source IP address and a source port number, the source IP address being an IP address assigned to a device in the logically independent subnet with which the corresponding tunnel connection is established, and the packet destination address defining a destination IP address to which the payload packet is addressed;

generating a source identifier from the tunnel identifier and packet address;

mapping the source identifier to a translated packet source address; and addressing the payload packet to the destination address using the translated packet source address;

wherein:

generating a source identifier from the tunnel identifier and packet address comprises generating a tuple comprising the tunnel identifier, the source IP address, and the destination IP address; and mapping the source identifier to the translated packet source address comprises generating connection data defining an association of first and second sockets, the first socket defining a connection from an edge router that is assigned the source IP address to the data processing apparatus, and the second socket defining a connection from the data processing apparatus to a device at the destination IP address.

22. The system of claim 21, wherein the second socket includes the source IP address substituted for the IP address of the data processing apparatus.

* * * * *